Patented Aug. 14, 1934

1,969,980

UNITED STATES PATENT OFFICE 1,969,980

AMMONIUM SALT

Edward W. Harvey, New Brunswick, N. J., assignor to The Barrett Company, New York, N. Y., a corporation of New Jersey No Drawing. Application December 16, 1929, Serial No. 414,591

18 Claims. (Cl. 71—9)

This invention relates to a method for drying and improving the physical condition of ammonium salts, and to the product produced thereby.

In my prior U. S. Patent 1,608,737 I have described a process for improving the physical condition of ammonium sulfate by lowering the percentage of free moisture and free acid contained therein, which consists in the addition to commercial ammonium sulfate of a mixture of hemi-hydrate of calcium sulfate ($(CaSO_4)_2 \cdot H_2O$), and an alkaline material such as calcium oxide ($CaO$), calcium hydroxide ($Ca(OH)_2$), or calcium carbonate ($CaCO_3$), or in the addition of a suitable commercial product containing among its several ingredients hemi-hydrate of calcium sulfate and one or more basic materials, as calcium oxide or calcium hydroxide, such as the commercial products known as "stucco" or "plaster of Paris", or which involves the addition of the hemi-hydrate of calcium sulfate alone.

The present invention is a further improvement in the art, and has for its object, principally, the provision of a method for the treatment of ammonium salts suitable for use as fertilizers which involves the use of less expensive materials and which nevertheless results in a satisfactory reduction in the free moisture content of the salts so treated and a general improvement in the physical condition and free-running qualities of the ammonium salts. Another object of the invention is to provide a product which may be left in storage for longer periods than heretofore without caking, or undergoing other undesirable changes.

In carrying out the invention, dead burnt gypsum, preferably in a finely divided or powdered state, is added to ammonium sulfate or other ammonium salts, prepared by known methods. To accomplish the purposes of the invention, dehydrated calcium sulfate, that is, calcium sulfate containing substantially no water of composition, may be added in any form, but I have discovered that the best results are obtained when dead burnt gypsum is used. A most satisfactory product has been obtained when from 1 to 2% dead burnt gypsum was added to commercial sulfate of ammonia containing up to 3% moisture. The calcium sulfate may also be in the form of finely ground anhydrite, or dry by-product substantially anhydrous calcium sulfate, or a substantially dehydrated calcium sulfate from any other source.

It has been found in practice that the drying effect of dead burnt gypsum on commercial ammonium salts is materially great. It is generally considered that calcium sulfate, substantially completely dehydrated, absorbs water but very slowly. The natural inference would be, therefore, that the capacity of dead burnt gypsum for removing water from other substances, especially where moisture is present in small amounts, would be inappreciable. I have discovered that dead burnt gypsum, contrary to what might be expected, is particularly adapted for this purpose when used in accordance with the present invention. There are indications that that there is a reaction between the calcium sulfate and ammonium salt resulting in the formation of a double salt which takes up, per unit of calcium sulfate, a greater number of molecules of water, as water of crystallization, than would be expected.

It is the present belief that it is on the slowness with which calcium sulfate absorbs water that its value in the present invention depends. Because calcium sulfate absorbs water slowly, it may well be that its effectiveness is not quickly spent, and hence it is capable of absorbing water taken into the sulfate long after it has been packed in the usual jute sacks. However, it will be understood that the present invention does not depend upon the correctness of the foregoing theory.

For the purpose of further improving the condition of ammonium salts and reducing the free acid content thereof, in addition to dead burnt gypsum, small quantities of basic materials, such as lime ($CaO$), calcium hydroxide ($Ca(OH)_2$), or calcium carbonate ($CaCO_3$), or a mixture of any or all of these may be added as described in my prior patent. When the use of such materials is desired, the relative proportions of basic substances to the dead burnt gypsum, and the amount of such mixture necessary to improve the condition of a given amount of ammonium salt will depend upon the quantity of free moisture and free acid in the ammonium salts to be dried and neutralized. The necessary proportions and amounts may be readily determined for any particular salt. The amounts of the dead burnt gypsum employed should be sufficient to absorb the greater portion of the free moisture present in the ammonium salt, the quantity of basic material should, of course, be so limited as not to decompose any appreciable amount of the ammonium salt with the consequent loss of ammonia. The quantity of dead burnt gypsum, or the mixture of dead burnt gypsum and basic material added may vary from less than 1% to about 10% of the ammonium salts to be treated depending upon the amount of free water and free acid present in the salts.

The ammonium salt may be mixed with the dead burnt gypsum or a mixture of dead burnt gypsum and associated basic material in any convenient manner. For example, the conditioning materials may be blown or otherwise applied as a dust over the salt crystals while the latter are being tumbled or agitated in a rotary drum. One specific example of the practice of the invention is as follows: To about 1980 pounds of ammonium sulfate, containing about half of 1% of free moisture and about half of 1% of free sulfuric acid, is added 20 pounds of finely ground substantially dehydrated calcium sulfate (CaSO₄). The calcium sulfate may be mixed with the sulfate of ammonia in any convenient manner that will accomplish intimate mixing, and effect a thorough coating of the sulfate particles by the finely powdered calcium sulfate. In commercial practice, sulfate of ammonia is frequently passed through drying ovens to reduce the moisture content thereof. The addition of calcium sulfate according to this invention may be made as the ammonium sulfate leaves the drying oven.

The invention is applicable to the treatment of ammonium sulfate, ammonium phosphate, ammonium chloride, ammonium nitrate, or to mixtures of any or all of these, but is more particularly adapted for, and its beneficial effect is greater in the treatment of ammonium sulfate.

The terms "commercial ammonium sulfate" or "commercial ammonium salts" as used in the claims are intended to include ammonium salts, the moist condition or water content of which corresponds to that of ammonium salts which have been dried in accordance with usual practice and contain only the residual moisture not removed by the usual drying operations.

I claim:

1. The process of improving the condition of an ammonium salt adapted for use as a fertilizer which comprises adding thereto substantially anhydrous calcium sulfate having the property of taking up water slowly.

2. The process of improving the condition of an ammonium salt adapted for use as a fertilizer which comprises adding thereto dead burnt gypsum.

3. The process of improving the condition of hygroscopic ammonium sulfate which comprises adding thereto substantially anhydrous calcium sulfate having the property of taking up water slowly.

4. The process of improving the condition of commercial ammonium sulfate which comprises adding thereto dead burnt gypsum.

5. The process of improving the condition of a mixture of ammonium salts including ammonium sulfate adapted for use as a fertilizer which comprises adding thereto substantially anhydrous calcium sulfate having the property of taking up water slowly.

6. The process of improving the condition of a mixture of commercial ammonium salts including ammonium sulfate adapted for use as a fertilizer which comprises adding thereto dead burnt gypsum.

7. The process of improving the condition of an ammonium salt adapted for use as a fertilizer which comprises adding thereto a mixture comprising substantially anhydrous calcium sulfate having the property of taking up water slowly, and a basic compound.

8. The process of improving the condition of commercial ammonium sulfate which comprises adding thereto a mixture comprising dead burnt gypsum and a basic compound.

9. The process of improving the condition of an ammonium salt adapted for use as a fertilizer which comprises adding thereto a mixture comprising dead burnt gypsum and a basic calcium compound.

10. The process of improving the condition of commercial ammonium sulfate which comprises adding thereto a mixture comprising dead burnt gypsum and a basic calcium compound.

11. A product suitable for use as a fertilizer comprising a commercial ammonium salt and substantially anhydrous calcium sulfate having the property of taking up water slowly.

12. A product suitable for use as a fertilizer comprising a commercial ammonium salt suitable for use as a fertilizer and dead burnt gypsum.

13. A product suitable for use as a fertilizer comprising a mixture of commercial ammonium salts including ammonium sulfate and substantially anhydrous calcium sulfate having the property of taking up water slowly.

14. A product suitable for use as a fertilizer comprising a mixture of commercial ammonium salts including ammonium sulfate and dead burnt gypsum.

15. A product suitable for use as a fertilizer comprising commercial ammonium sulfate and substantially anhydrous calcium sulfate having the property of taking up water slowly.

16. A product suitable for use as a fertilizer comprising commercial ammonium sulfate and dead burnt gypsum.

17. A product suitable for use as a fertilizer comprising a commercial ammonium salt, substantially anhydrous calcium sulfate having the property of taking up water slowly, and a basic compound.

18. A product suitable for use as a fertilizer comprising a commercial ammonium salt suitable for use as a fertilizer, dead burnt gypsum and a basic calcium compound.

EDWARD W. HARVEY.